Dec. 8, 1964 S. BENNON ETAL 3,160,839
ELECTRICAL INDUCTIVE APPARATUS
Filed June 7, 1961 3 Sheets-Sheet 1

WITNESSES
Edwin E. Bassler
James T. Young

INVENTORS
Saul Bennon and
Brian W. Hugon
BY
Clement L. McHale
ATTORNEY

United States Patent Office 3,160,839
Patented Dec. 8, 1964

3,160,839
ELECTRICAL INDUCTIVE APPARATUS
Saul Bennon and Brian W. Hugon, Sharon, Pa., assignors to Westinghouse Electric Corporation, East Pittsburgh, Pa., a corporation of Pennsylvania
Filed June 7, 1961, Ser. No. 115,552
12 Claims. (Cl. 336—84)

This invention relates to electrical inductive apparatus, such as reactors, and more particularly to magnetic shielding means for such apparatus.

Certain types of conventional electrical inductive apparatus, such as reactors, have been employed in the past to compensate for the capacitive reactance or capacitive charging kva. of high voltage transmission lines. If the inductive reactive load of such reactors were not provided on a transmission system, there would be a tendency for the voltages on the system to rise or increase to dangerous values when the lines of the system are only lightly loaded and to cause serious damage to equipment connected to the transmission system. One method which has been employed to provide the required inductive reactive kva. in a transmission system as described is to connect reactors which are designed for relatively low voltages or potentials across the tertiary windings of high voltage transformers which are employed in the transmission system. The latter method has the important disadvantage that a transformer must be located at the point in a transmission system to which an inductive reactor is to be connected. Other disadvantages of conventional reactors of the type described are related to the limited operating potentials or voltages at which such reactors may be applied. It is therefore desirable to provide an improved inductive reactor which is specifically adapted or designed for application at very high operating potentials or voltages and which would eliminate the need for a separate transformer at the point in a transmission system to which the reactor is to be connected.

It is an object of this invention to provide a new and improved electrical inductive apparatus, such as a reactor.

Another object of this invention is to provide a new and improved magnetic shielding means for electrical inductive apparatus.

A further object of this invention is to provide a new and improved means for supporting the windings of an electrical inductive apparatus, such as a reactor.

Other objects of the invention will in part be obvious and will, in part, appear hereinafter.

For a fuller understanding of the nature and objects of the invention, reference should be had to the following detailed description, taken in connection with the accompanying drawing, in which.

Figure 1:
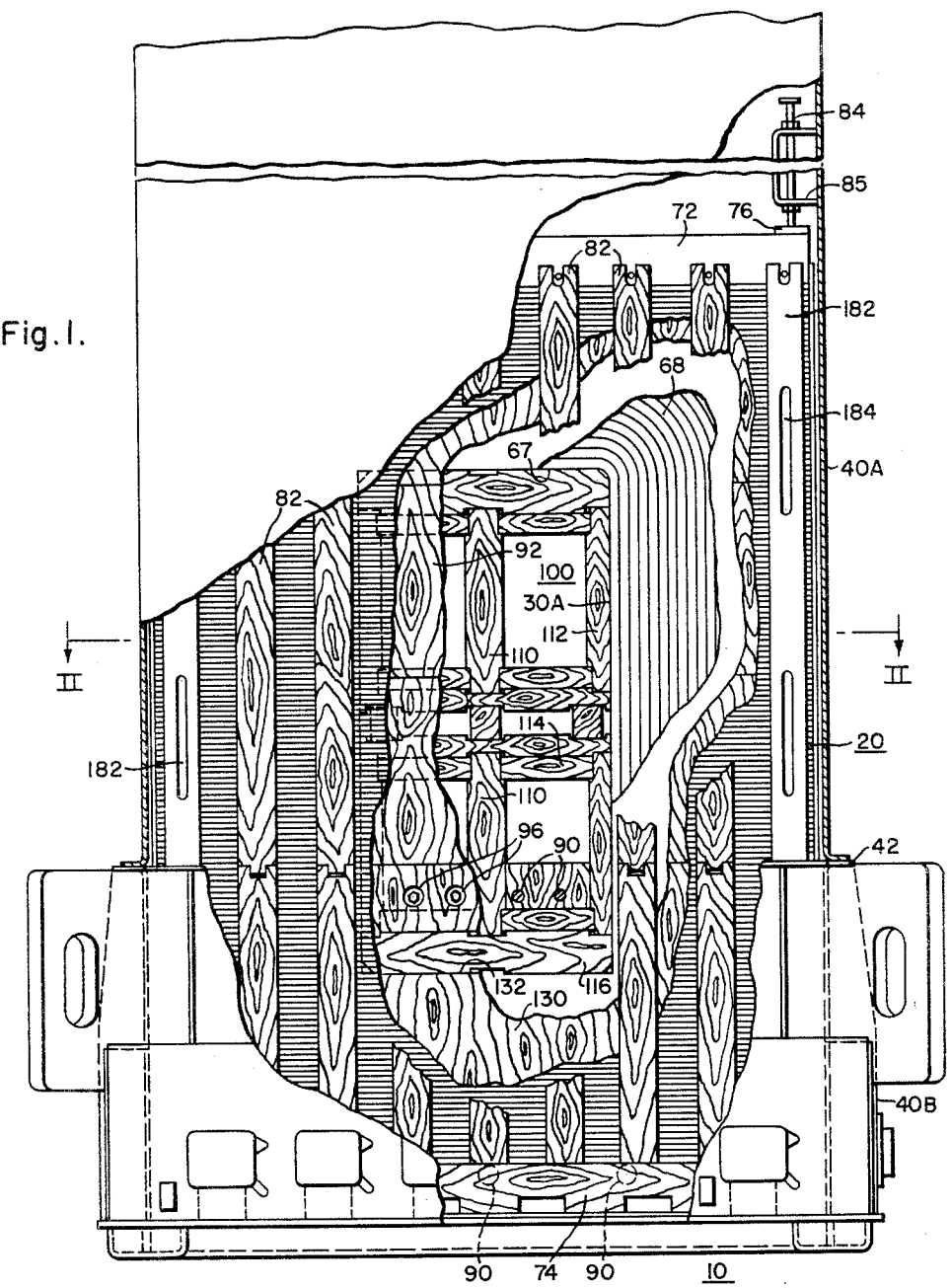
FIG. 1 is a partial elevational view, partly broken away, of a reactor incorporating the teachings of the invention.
Figure 2:
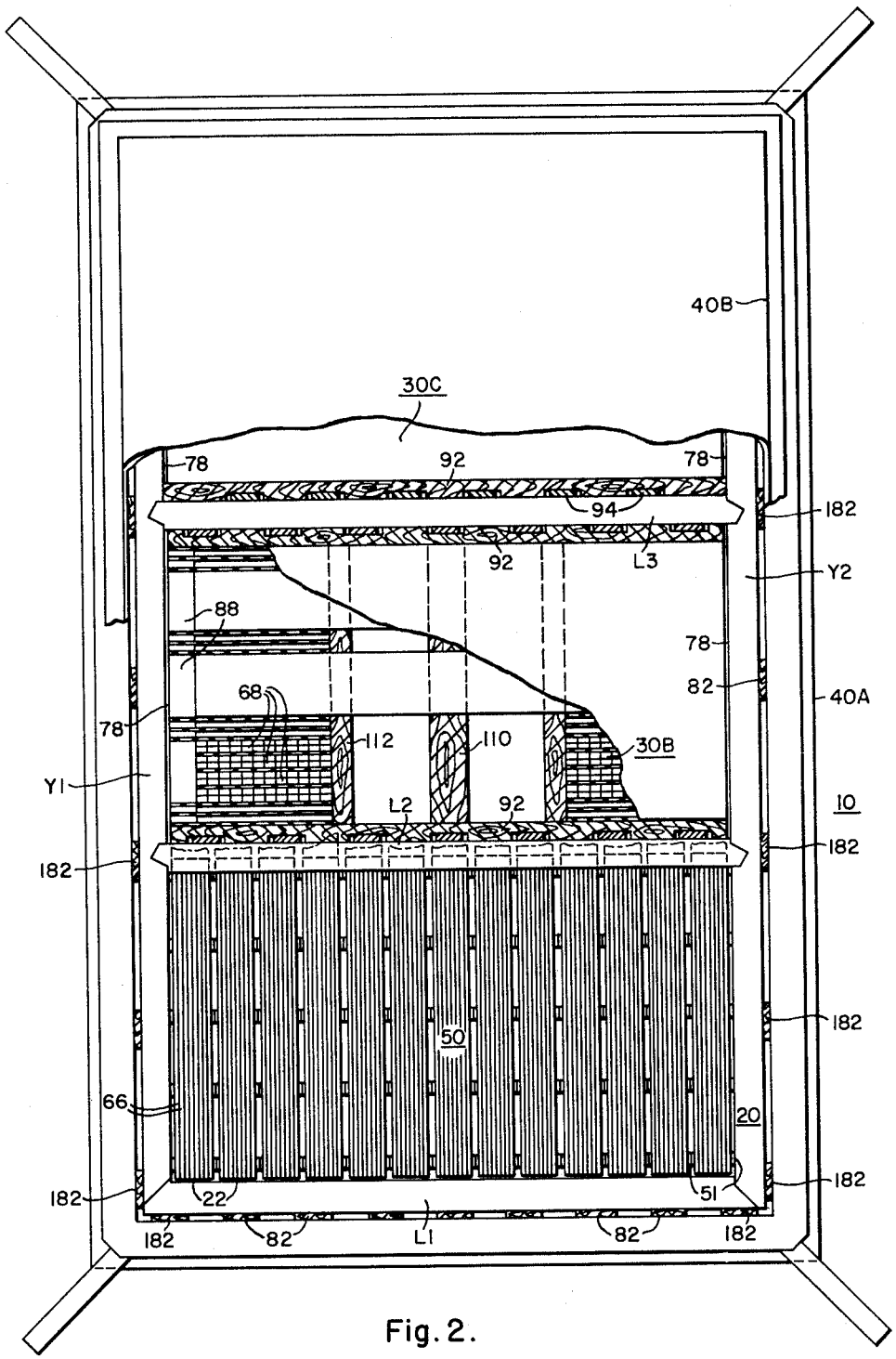
FIG. 2 is a top plan view partly broken away of the reactor shown in FIG. 1.
Figure 4:
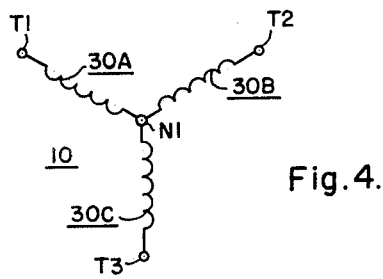
FIG. 4 is a schematic diagram illustrating typical connections of the windings of the reactor shown in FIGS. 1 through 3.

Referring now to the drawings and FIGS. 1 and 2 in particular, there is illustrated a three-phase inductive reactor 10 embodying the teachings of the invention. In general, the reactor 10 comprises a casing or tank 40 which includes the upper and lower sections 40A and 40B, respectively, and the three electrical phase windings 30A, 30B and 30C which are disposed inside said casing. The phase windings 30A, 30B and 30C of the reactor 10 may be connected either in a delta or Y arrangement. As illustrated in FIG. 4, for a Y connection, one end of each of the phase windings 30A, 30B and 30C is electrically connected to a neutral point or terminal as indicated at N1 and the other ends of said phase windings are connected to the terminals indicated at T1, T2 and T3, respectively. When the reactor 10 is applied on a high voltage electric power transmission system, the terminals T1, T2 and T3 would be electrically connected to the line conductors of the system, while the neutral terminal N1 would be be connected to the neutral conductor of the system or grounded. It is to be noted that the casing 40 of the reactor 10 is normally filled to a predetermined level with a fluid dielectric (not shown), such as an insulating oil, which assists in electrically insulating the phase windings 30A, 30B and 30C from each other and from certain grounded portions of the reactor 10, as well as in cooling certain portions of the reactor 10 which heat up during the operation of said reactor. In the latter construction, the phase windings 30A, 30B and 30C of the reactor 10 would be substantially immersed in the fluid dielectric.

More specifically, the casing 40 comprises the lower base section 40B and the upper cover section 40A which are both normally formed or fabricated from a suitable material having sufficient structural strength, such as steel, which is also a magnetic and electrically conducting material. The sections 40A and 40B of the casing 40 both include vertically extending side wall portions and flanged portions which meet and are secured together in a substantially fluid-tight joint, as indicated at 42, by any suitable method, such as welding.

As best shown in FIGS. 1 and 2, each of the phase windings 30A, 30B and 30C includes a plurality of pancake-type or flat disk-type coils 68 which may be divided into groups, as indicated at 88, and which are disposed adjacent to one another in side-by-side relation along a common axis. Each of the coils 68 comprises a plurality of conductor turns which are generally spirally wound about a substantially rectangular central opening, as indicated at 67 in FIG. 1. The coils 68 of each of the phase windings 30A, 30B and 30C, which are substantially rectangular in configuration, are assembled with the central openings substantially aligned or in substantial registry and with the adjacent coils or groups of coils being electrically insulated from one another by sheets or layers of a suitable insulating material, such as pressboard, having the same shape as the associated coils. It is to be noted that the coils 68 of each of the phase windings 30A, 30B and 30C are disposed substantially vertically and substantially parallel to one another which facilitates the flow of an associated insulating and cooling fluid over said coils which heat up during the operating of the reactor 10.

In order to substantially prevent the magnetic flux produced by the current flow in the phase windings 30A, 30B and 30C from entering into or passing through the sidewall portion of the casing sections 40A and 40B and causing excessive losses, such as eddy current and hysteresis losses, in said sidewall portions and to substantially eliminate interaction between the magnetic fluxes produced by current flow in the respective phase windings 30A, 30B and 30C and the corresponding mechanical forces which would otherwise result during certain operating conditions of the reactor 10, the first magnetic shielding member 20 is disposed between said phase windings and the sidewall portions of the casing sections 40A and 40B and between the respective phase windings 30A, 30B and 30C. In general, the first magnetic shielding member 20 provides a low reluctance path for the magnetic fluxes produced by current flow in the phase windings 30A, 30B and 30C between said phase windings and the sidewall portions of the casing sections 40A and 40B which effectively shunts the magnetic fluxes away from the sidewall portions of the casing sections 40A and 40B and also provides a low reluctance path between the respective phase windings which prevents interaction between the magnetic fluxes produced by current flow in the respective phase windings 30A, 30B and 30C.

Figure 5:
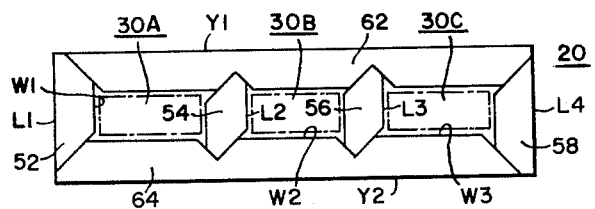
FIG. 5 is a top plan view of a magnetic shielding means which forms part of the reactor shown in FIGS. 1 through 3, with the windings of the reactor indicated in dotted outline; and, FIG. 6 is a fragmentary view, partly in section of a portion of the reactor shown in FIGS. 1 through 3.

More specifically, the first shielding member 20 comprises a plurality of stacked layers of laminations formed from magnetic strip material having at least one preferred direction of magnetic orientation substantially parallel to its edges or longitudinal dimension, such as cold rolled silicon steel. The latter material also has a much higher magnetic permeability than that of the material from which the casing 40 is formed. As best shown in FIG. 5, the laminations of each layer of the shielding member 20 are assembled around three substantially rectangular windows as indicated at W1, W2 and W3 in which the associated phase windings 30A, 30B and 30C, respectively, are disposed. Each layer of laminations includes first, second, third and fourth leg laminations as indicated at 52 through 58, respectively, which are disposed in parallel with and spaced apart from one another and the associated first and second yoke laminations 62 and 64, respectively, which connect the ends of the associated leg laminations to form the closed magnetic paths in the different portions of the magnetic shielding member 20, when the successive layers of laminations of the shielding member 20 are stacked, the corresponding leg members L1 through L4 and the corresponding yoke members Y1 and Y2 which include a plurality of leg or yoke laminations, respectively, are formed as indicated in FIG. 5. The ends of each of the laminations which make up the magnetic shielding member 20 are cut at oblique angles or diagonally with respect to the preferred direction of orientation of the magnetic strip material from which said laminations are formed in order that the magnetic flux in said shielding member will travel in a direction which is substantially coincident with said orientation in the different portions of said shielding member. Alternate layers of laminations of the shielding member 20 are reversed during stacking so that the meeting ends of the leg and yoke laminations from diagonal butt-lap joints to reduce the overall reluctance of the magnetic shielding member 20.

Examples of other suitable types of magnetic sheet or strip material from which the laminations of the shielding member 20 may be formed include sheets of silicon-iron and aluminum-iron alloys containing from 1 to 7% silicon and from 1 to 10% aluminum respectively. The sheets of said alloys have grains whose crystal lattice structure comprises four cube edges perpendicular to the plane of the sheet, known as cube texture, which may be either doubly oriented or randomly oriented. The major volumetric proportion of the sheets is composed of grains having a crystalline lattice structure such that a cube face lies substantially parallel to the surface of the sheet and in the doubly oriented material, four cube edges of the cube lattice are parallel to the rolling direction or edge of the sheet and four cube edges are transverse thereto. In the randomly oriented cube texture material, the grains have eight cube edges randomly oriented parallel to the surface of the sheet. One such doubly oriented cube texture silicon-iron alloy is that disclosed in copending application Serial No. 681,333, filed August 30, 1957, and now abandoned, and in copending application Serial No. 19,440, filed April 21, 1960, now Patent No. 2,992,951, which are both assigned to the same assignee as the present application.

Figure 3:
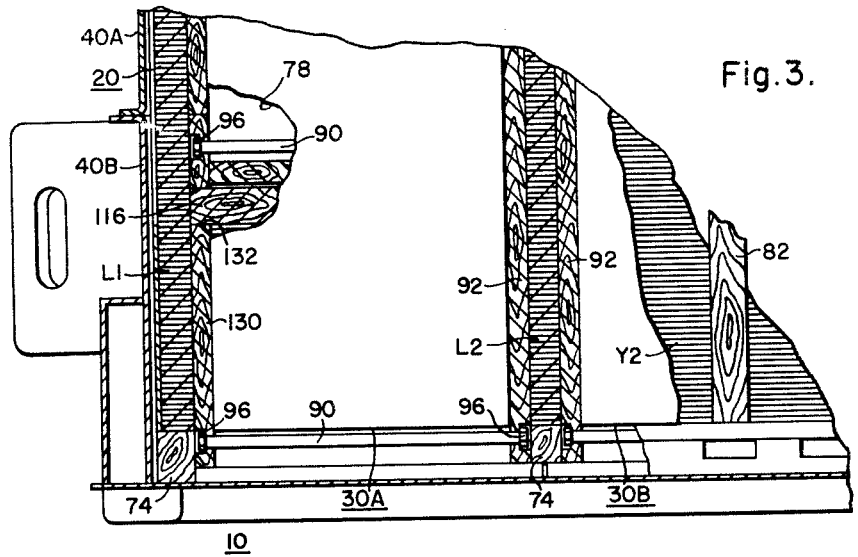
FIG. 3 is an additional partial elevational view, partly broken away, of the reactor shown in FIGS. 1 and 2.

In order to provide support for the laminations of the shielding member 20 and to prevent the shorting of the laminations of the second shielding member 50 as will be explained hereafter, as well as to permit the entrance into and the flow along the bottom of the lower case section 40B of a cooling fluid, the lower base supporting members 74 are disposed between the shielding member 20 and the bottom of the lower section 40B of the casing 40, as best shown in FIGS. 1 and 3. The supporting members 74 are formed from a suitable nonmagnetic and electrically insulating material, such as wood, to reduce the losses that would otherwise result during the operation of the reactor 10. In order to maintain the laminations of the shielding member 20 in assembled relationship the upper supporting beams or members 72 are provided or disposed on top of the laminations of the shielding member 20, as best shown in FIG. 1. In order to maintain the upper beams or supporting members 72 and the associated laminations of the shielding member 20 under compression, a plurality of jack members 84 are provided each having a pressure plate 76 mounted at the bottom thereof to bear against the associated upper beams or supporting members 72, as shown in FIG. 1. The jack members 84 are supported in turn by the channel members 85 which are secured or welded to the inside of the upper casing section 40A above the phase windings 30A, 30B and 30C and the associated shielding member 20. The upper supporting beams or members 72 are also formed from a suitable nonmagnetic and electrically insulating material to prevent additional losses in the reactor 10.

In order to mechanically brace the shielding member 20 against mechanical forces which occur during certain operating conditions of the reactor 10 and to prevent the laminations of the shielding member 20 from being electrically shorted by the sidewall portions of the casing sections 40A and 40B, a plurality of bracing or wedge members 82 are disposed between said shielding member and the sidewall portions of the casing sections 40A and 40B, as best shown in FIGS. 1 and 2. The bracing members 82 are spaced around the outer periphery of the shielding member 20 to provide cooling ducts through which an associated cooling fluid may flow vertically by convection or under pressure to assist in the cooling of the shielding member 20 which also heats up during the operation of the reactor 10. The bracing members 82 are also formed from a suitable nonmagnetic and electrically insulating material, such as wood.

Figure 6:
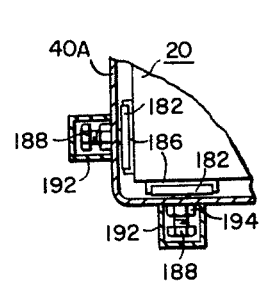

In order to provide additional bracing at the diagonal joints between the laminations which make up the shielding member 20, the bracing members 182 are disposed in similar fashion to the bracing members 82 adjacent to each of the diagonal joints between said laminations to prevent relative movement of said laminations during the operation or transportation of the reactor 10. As best shown in FIGS. 1 and 6, each of the bracing members 182 includes one or more longitudinal slots or recesses 184 on the outer surface thereof and is formed from a suitable material having sufficient mechanical strength, such as steel, which may also be metallic and electrically conducting. In order to prevent shorting of the laminations of the shielding member 20 by the bracing members 182, the electrically insulating members or channels 186 may be disposed between the bracing members 182 and the shielding member 20. In order to press the bracing members 182 against the outside of the shielding member 20, a plurality of jack screws 188 may be disposed to bear against the slots 184 of the bracing member 182. The jack screws 188 pass through the nuts 194 which are secured or welded to the sidewall portions of the casing sections 40A and 40B. The cover members 192 are then secured or welded to the casing sections 40A and 40B over the associated jackscrews in substantially fluid tight joints.

A plurality of bracing members 92 are also disposed between the shielding member 20 and the ends of the associated phase windings 30A, 30B and 30C to brace said windings against the mechanical forces which may result during the operation of the reactor 10. The wedge or bracing members 92 are disposed between the shielding member 20 and the ends of each of the phase windings 30A, 30B and 30C and formed from a suitable nonmagnetic and electrically insulating material, such as wood, to minimize the losses in the reactor 10 during the operation of said reactor. A plurality of additional bracing or wedging members 94 are disposed between the shielding member 20 and each of the bracing members 92 to provide additional bracing against the mechanical forces which may result during certain operation conditions of the reactor 10, such as when short circuit currents flow in the phase windings 30A, 30B and 30C. The bracing or wedging members 94 are disposed in a plurality of associated recesses or openings in the bracing members 92, as best shown in FIG. 2. The bracing members 94 also preferably formed from a suitable nonmagnetic and electrically insulating material, such as wood, similarly to the bracing members 92.

In order to provide a mechanically tight assembly at the sides of the coil 68 which make up each of the phase windings 30A, 30B and 30C and the associated shielding member 20, layers or sheets of a suitable electrically insulating material, such as pressboard, may be disposed between the sides of the phase windings 30A, 30B and 30C and the shielding member 20, as indicated at 78 in FIGS. 2 and 3.

In order to substantially prevent the magnetic flux produced by current flow in the phase windings 30A, 30B and 30C from entering into or passing through the bottom portion of the lower section 40B of the casing 40 and causing excessive losses, such as eddy current and hysteresis losses, the second shielding member 50 is disposed between said phase windings and the bottom portion of the lower section 40B of the casing 40 to provide a low reluctance magnetic path for said magnetic flux and effectively shunt said magnetic flux away from said bottom portion. More specifically, the second shielding member 50 comprises a plurality of stacks or bundles 22 of relatively thin laminations 66 which are substantially rectangular in configuration. The laminations 66 are formed from magnetic strip material of the types previously discussed in connection with the first shielding member 20 which have at least one preferred direction of magnetic orientation substantially parallel to the longitudinal dimension or edges of said strip material. The bundles or stacks 22 are disposed longitudinally of the casing 40 at the bottom of said casing and laterally spaced apart from one another, as best shown in FIG. 2. In particular the bundles or stacks 22 are secured to the bottom of the lower section 40B of the casing 40 by first securing or welding said bundles of laminations to the mounting plates 51 which in turn are secured or welded to the bottom of the lower section 40B of the casing 40. A plurality of the mounting plates 51 is disposed in spaced relation along the longitudinal dimension of each of the bundles or stacks 22.

In order to maintain the substantially rectangular shape of the central openings 67 of the coils 68 which make up each of the phase windings 30A, 30B and 30C and also to assist in supporting said phase windings within the windows of the associated shielding member 20, each of said phase windings is provided with a bracing member 100, as is best shown in FIGS. 1 through 3. Each of the bracing members 100 passes through the central openings of all of the coils 68 of the associated phase windings.

More specifically, the bracing member 100 includes an outer peripheral portion, as indicated at 112, which substantially fills the central openings 67 of the coils 68 of the associated phase winding and which is substantially rectangular in configuration to match the shape of the central openings 67. In addition, the bracing member 100 includes the first and second cross braces or pieces 110 and 114, respectively, which are disposed at substantially right angles with respect to each other and which extend vertically and horizontally respectively between, the ends and sides, respectively, of the outer peripheral portion 112 of the bracing member 100. Finally, the bracing member 100 includes the projecting portions 116 at both ends thereof which extend axially beyond the ends of the associated phase windings, as best shown in FIGS. 1 and 3. The different portions of the bracing member 100 just described are preferably formed from a suitable nonmagnetic and electrically insulating material, such as wood, in order to minimize the losses of the reactor 10 during the operation thereof.

In order to support each of the phase windings 30A, 30B and 30C within one of the windows of the associated shielding member 20, a pair of supporting end members or mounting feet 130 are provided at the opposite ends of each of said phase windings and cooperate with the associated bracing member 100 of each of said phase windings to provide a generally U-shaped supporting structure for each of said phase windings which are essentially free standing within the windows of said shielding member. Each of the supporting members 130 is a vertically extending plate in configuration and includes an elongated horizontal opening as indicated at 132 in FIGS. 1 and 3 through which one of the projecting portions 116 of the associated bracing member 100 passes to support the associated phase winding. Similarly to the bracing member 100, the supporting members 130 are also preferably formed from a suitable nonmagnetic and electrically insulating material, such as wood, and for the same reasons.

In order to maintain the supporting members 130 in assembled relationship with the associated phase windings and bracing members, a plurality of tie rods or retaining bolts 90 is provided for each of said phase windings. A portion of the tie rods 90 pass through the central openings 67 of the coils 68 of the associated phase winding and are secured to the associated supporting means 130 by any suitable means such as the nuts 96 which engage the threaded ends of said tie rods. Similarly, a portion of the tie rods 90 extend axially between the supporting members 130 of each of the phase windings below said phase windings and engage or are secured to the associated supporting members 130 by any suitable means, such as the nuts 96, as best shown in FIG. 3. The tie rods 90 are preferably formed from any suitable nonmagnetic and electrically insulating material having sufficient structural strength, such as wood.

It is important to note that the space enclosed by the central openings of the coils 68 which make up each of the phase windings 30A, 30B and 30C is filled with substantially nonmagnetic material and that no portion of the magnetic shielding member 20 or of the magnetic shielding member 50 extends into the central openings of the coils of said phase windings and, therefore, the reactor 10 is of the type known to the art as an "air core" reactor which has a substantially linear reactance characteristic even for abnormal operating conditions, such as a short circuit. In other words, when current flows through the respective phase windings 30A, 30B and 30C, the different paths through which the magnetic flux produced thereby passes are substantially nonmagnetic in nature.

In summary, the first shielding member 20 in combination with the second shielding member 50 substantially prevents any stray or leakage magnetic flux produced by current flow in the respective phase windings 30A, 30B and 30C from entering into or passing through the sections 40A and 40B of the casing 40 which might otherwise cause excessive losses in said casing. It is not normally necessary to magnetically shield the upper portion of the upper section 40A of the casing 40 since the latter portion of the casing 40 is usually physically much farther away from the windings 30A, 30B and 30C of the reactor 10. It should also be noted that the first shielding member 20 in cooperation with the second shielding member 50 provides a receptacle or container for each of the phase windings 30A, 30B and 30C in which said phase windings may be conveniently insulated for very high operating potentials and also braced to withstand the mechanical forces which may be present during certain abnormal operating conditions of the reactor 10 such as during a short circuit, when very large currents tend to flow in the windings of said reactor.

It is to be understood that the teachings of the invention may also be incorporated in a single phase reactor rather than a three phase reactor as illustrated in the drawings.

The apparatus embodying the teachings of this invention has several advantages. For example, the shielding arrangements disclosed effectively isolates the phase windings of the reactor from the associated casing and also from the other associated phase windings to reduce the losses that result during the operation of the reactor and to prevent the mechanical forces that would otherwise result during certain operating conditions due to the interaction of the magnetic fluxes produced by current flow in the respective phase windings. In addition, improved means are provided for supporting the different phase windings within the associated shielding structure and bracing said phase windings against the mechanical forces that may result during certain operating conditions of the reactor. Finally, the reactor construction disclosed readily lends itself or is adapted for designs at very high operating potentials to substantially eliminate the requirement for a separate transformer at a particular point in the transmission system to which the reactor is to be connected.

Since numerous changes may be made in the above described apparatus and different embodiments of the invention may be made without departing from the spirit and scope thereof, it is intended that all the matter contained in the foregoing description or shown in the accompanying drawing shall be interpreted as illustrative and not in a limiting sense.

We claim as our invention:

1. A three-phase reactor comprising a casing of magnetic material having a bottom portion and side wall portions, three electrical phase windings each having a central opening therein, disposed in said casing and spaced apart from one another, non-magnetic means disposed in the central openings in said three electrical phase windings, a first magnetic shielding member disposed between the respective phase windings and between said phase windings and the side wall portions of said casing, and a second magnetic shielding member disposed between the bottom portion of said casing and said phase windings, said first shielding member comprising a plurality of stacked layers of leg and yoke laminations formed from magnetic strip material and assembled to form three substantially rectangular windows with a closed magnetic circuit around each window, one of said phase windings being disposed in each of the respective windows of said first shielding member, with only one winding being disposed in each window.

2. A three-phase reactor comprising a casing having a bottom portion and side wall portions, three electrical phase windings disposed in said casing and spaced apart from one another, each of said phase windings comprising a plurality of flat-disc coils each having a central opening, non-magnetic means disposed in the central openings in said flat-disc coils being disposed substantially vertically and adjacent to one another in side-by-side relation with their central openings being in substantial registry, and a magnetic shielding member comprising leg and yoke laminations disposed between the respective phase windings and between said windings and the side wall portions of said casing to provide a closed magnetic circuit around each winding and substantially prevent magnetic flux produced by current flow in said windings from passing into said side wall portions.

3. A three-phase reactor comprising a casing having a bottom portion and side wall portions, three electrical phase windings disposed in said casing and spaced apart from one another, each of said phase windings comprising a plurality of flat-disc coils each having a central opening, non-magnetic means disposed in said central openings, said flat-disc coils being disposed substantially vertically and adjacent to one another in side-by-side relation with their central openings being in substantial registry, and a magnetic shielding member disposed between the respective phase windings and between said windings and the side wall portions of said casing to substantially prevent magnetic flux produced by current flow in said windings from passing into said side wall portions, said magnetic shielding member comprising a plurality of stacked layers of leg and yoke laminations formed from magnetic strip material and assembled to form three substantially rectangular windows with a closed magnetic circuit around each window, one of said phase windings being disposed in each of the respective windows of said shielding members, with only one winding being disposed in each window.

4. A three-phase reactor comprising a casing having a bottom portion and side wall portions, three electrical phase windings disposed in said casing and spaced apart from one another, each of said phase windings comprising a plurality of flat-disc coils each having a central opening, non-magnetic means disposed in said central openings, said flat-disc coils being disposed substantially vertically and adjacent to one another in side-by-side relation with their central openings being in substantial registry, a first magnetic shielding member disposed between the respective phase windings and between said windings and the side wall portions of said casing to substantially prevent magnetic flux produced by current flow in said windings from passing into said side wall portions, said first magnetic shielding member comprising a plurality of stacked layers of leg and yoke laminations formed from magnetic strip material and assembled to form three substantially rectangular windows with a closed magnetic circuit around each window, one of said phase windings being disposed in each of the respective windows of said shielding member, with only one winding being disposed in each window, and a second magnetic shielding member disposed between said phase windings and the bottom of said casing, said second shielding member comprising a plurality of spaced bundles of laminations formed from magnetic strip material.

5. A reactor comprising a casing of magnetic material having a bottom portion and side wall portions, an electrical winding disposed in said casing, said winding comprising a plurality of flat-disc type coils disposed substantially vertically and adjacent to one another in side-by-side relation, each of said coils including a central opening therethrough, said coils being assembled with the central openings substantially aligned and a magnetic shielding member disposed between the side wall portions of said casing and said winding, said shielding member comprising a plurality of stacked layers of leg and yoke laminations formed from magnetic strip material assembled to form a substantially rectangular window with a closed magnetic circuit around the window, the central openings of said coils being filled with substantially non-magnetic and electrically insulating material for supporting the coils.

6. A reactor comprising a casing of magnetic material having a bottom portion and side wall portions, an electrical winding disposed in said casing, said winding comprising a plurality of flat-disc type coils disposed substantially vertically and adjacent to one another in side-by-side relation, each of said coils including a central opening therethrough, said coils being assembled with the central openings substantially aligned and a magnetic shielding member disposed between the side wall portions of said casing and said winding, said shielding member comprising a plurality of stacked layers of leg and yoke laminations formed from magnetic strip material assembled to form a substantially rectangular window with a closed magnetic circuit around the window, and a supporting member formed from substantially nonmagnetic and electrically insulating material, said supporting member extending through the central openings of the coils of said winding and having lower depending portions to support said winding within the window of said shielding member.

7. A reactor comprising a casing of magnetic material having a bottom portion and a side wall portion, an electrical winding disposed in said casing, said winding including a plurality of substantially rectangular pancake type coils disposed substantially vertically and adjacent to one another in side-by-side relation, each of said coils including a substantially rectangular central opening, said coils being assembled with the central openings in substantial registry, a magnetic shielding member disposed between said winding and the side wall portion of said casing, said shielding member comprising a plurality of stacked layers of leg and yoke laminations assembled to form a substantially rectangular window with a closed magnetic circuit around the window, a substantially rectangular bracing member disposed in the central openings of the coils of said winding to maintain the substantially rectangular shape of said openings, and a pair of supporting members disposed at the opposite ends of said bracing member to engage said bracing member and form therewith a generally U-shaped supporting structure for supporting said winding within the window of said shielding member.

8. A reactor comprising a casing of magnetic material having a bottom portion and a side wall portion, an electrical winding disposed in said casing, said winding including a plurality of substantially rectangular pancake type coils disposed substantially vertically and adjacent to one another in side-by-side relation, each of said coils including a substantially rectangular central opening, said coils being assembled with the central openings in substantial registry, a magnetic shielding member disposed between said winding and the side wall portion of said casing, said shielding member comprising a plurality of stacked layers of leg and yoke laminations assembled to form a substantially rectangular window with a closed magnetic circuit around the window, a substantially rectangular bracing member disposed in the central openings of the coils of said winding to maintain the substantially rectangular shape of said openings, and a pair of supporting members disposed at the opposite ends of said bracing member to engage said bracing member and form therewith a generally U-shaped supporting structure for supporting said winding within the window of said shielding member, said bracing member and said pair of supporting members being formed from material which is both nonmagnetic and electrically insulating.

9. A three-phase reactor comprising a casing of magnetic material having a bottom portion and a side wall portion, three electrical phase windings disposed in spaced relation in said casing, each of said windings including a plurality of flat-disc type coils disposed substantially vertically and in side-by-side relation, each of said coils including a substantially rectangular central opening, the coils of each phase winding being assembled with the central openings substantially aligned, a magnetic shielding member disposed between the respective phase windings and between said phase windings and the side wall portion of said casing, said shielding member comprising a plurality of stacked layers of leg and yoke laminations formed from magnetic strip material having a higher permeability than the magnetic material of said casing and assembled to form three substantially rectangular windows with a closed magnetic circuit around each window, separate bracing members disposed to pass through the central openings of the coils of each of said phase windings, said bracing members each including a cross-shaped portion and an outer peripheral portion which substantially fills the central openings of the associated coils, and a pair of supporting members disposed at the opposite ends of each of said phase windings to support the ends of the associated bracing member and support the associated phase winding within one of the windows of said shielding member.

10. A three-phase reactor comprising a casing of magnetic material having a bottom portion and a side wall portion, three electrical phase windings disposed in spaced relation in said casing, each of said windings including a plurality of flat disc type coils disposed substantially vertically and in side-by-relation, each of said coils including a substantially rectangular central opening, the coils of each phase winding being assembled with the central openings substantially aligned, a magnetic shielding member disposed between the respective phase windings and between said phase windings and the side wall portion of said casing, said shielding member comprising a plurality of stacked layers of leg and yoke laminations formed from magnetic strip material having a higher permeability than the magnetic material of said casing and assembled to form three substantially rectangular windows with a closed magnetic circuit around each window, separate bracing members disposed to pass through the central openings of the coils of each of said phase windings, said bracing members each including a pair of projecting portions which extend axially beyond the opposite ends of the associated phase winding, a cross-shaped portion and an outer peripheral portion which substantially fills the central openings of the associated coils, and a pair of supporting members disposed at the opposite ends of each of said phase windings to support the ends of the associated bracing member and support the associated phase winding within one of the windows of said shielding member, each of said supporting members including an elongated opening through which one of the projecting portions of the associated bracing member pass.

11. A three-phase reactor comprising a casing of magnetic material having a bottom portion and a side wall portion, three electrical phase windings disposed in spaced relation in said casing, each of said windings including a plurality of flat disc type coils disposed substantially vertically and in side-by-side relation, each of said coils including a substantially rectangular central opening; the coils of each phase winding being assembled with the central openings substantially aligned, a magnetic shielding member disposed between the respective phase windings and between said phase windings and the side wall portion of said casing, said shielding member comprising a plurality of stacked layers of leg and yoke laminations formed from magnetic strip material having a higher permeability than the magnetic material of said casing and assembled to form three substantially rectangular windows with a closed magnetic circuit around each window, separate bracing members disposed to pass through the central openings of the coils of each of said phase windings, said bracing members each including a cross shaped portion and an outer peripheral portion which substantially fills the central openings of the associated coils, and a pair of supporting members disposed at the opposite ends of each of said phase windings to support the ends of the associated bracing member and support the associated phase winding within one of the windows of said shielding member, said bracing members and said supporting members being formed from material which is both nonmagnetic and electrically insulating.

12. A three-phase reactor comprising a casing of magnetic material having a bottom portion and a side wall portion, three electrical phase windings disposed in spaced relation in said casing, each of said windings including a plurality of flat disc type coils disposed substantially vertically and in side-by-side relation, each of said coils including a substantially rectangular central opening, the coils of each phase winding being assembled with the central openings substantially aligned, a first magnetic shielding member disposed between the respective phase windings and between said phase windings and the side wall portion of said casing, said shielding member comprising a plurality of stacked layers of leg and yoke laminations formed from magnetic strip material having a higher permeability than the magnetic material of said casing and assembled to form three substantially rectangular windows with a closed magnetic circuit around each window, separate bracing members disposed to pass through the central openings of the coils of each of said phase windings, said bracing members each including a cross-shaped portion and an outer peripheral portion which substantially fills the central openings of the associated coils, a pair of supporting members disposed at the opposite ends of each of said phase windings to support the ends of the associated bracing member and support the associated phase winding within one of the windows of said shielding member, and a second magnetic shielding member disposed between said phase windings and the bottom portion of said casing.

References Cited in the file of this patent
UNITED STATES PATENTS

| | | |
|---|---|---|
| 853,779 | Frank | May 14, 1907 |
| 1,272,166 | Young | July 9, 1918 |
| 2,340,081 | Sauer | Jan. 25, 1944 |
| 2,388,848 | Howe | Nov. 13, 1945 |
| 2,548,205 | Drobish et al. | Apr. 10, 1951 |

FOREIGN PATENTS

| | | |
|---|---|---|
| 370,271 | Great Britain | Apr. 7, 1932 |